(12) United States Patent
Alley

(10) Patent No.: US 9,599,172 B2
(45) Date of Patent: Mar. 21, 2017

(54) RELEASABLE FREEWHEEL CLUTCH

(71) Applicant: Profile Racing, Inc., St. Petersburg, FL (US)

(72) Inventor: Corey Alley, Madeira Beach, FL (US)

(73) Assignee: Profile Racing, INC., St. Petersburg, FL (US)

( * ) Notice: Subject to any disclaimer, the term of this patent is extended or adjusted under 35 U.S.C. 154(b) by 149 days.

(21) Appl. No.: 14/585,524

(22) Filed: Dec. 30, 2014

(65) Prior Publication Data

US 2016/0186821 A1   Jun. 30, 2016

(51) Int. Cl.
F16D 41/30 (2006.01)
F16D 41/26 (2006.01)

(52) U.S. Cl.
CPC ............. *F16D 41/30* (2013.01); *F16D 41/26* (2013.01)

(58) Field of Classification Search
CPC .......... F16D 41/12; F16D 41/26; F16D 41/30; B60B 27/023; B60B 27/047; Y10T 74/2135
USPC ........................................ 192/46, 64; 74/576
See application file for complete search history.

(56) References Cited

U.S. PATENT DOCUMENTS

| 3,511,348 | A | 5/1970 | Jonsson et al. |
| 5,054,594 | A | 10/1991 | Kampf et al. |
| 5,967,934 | A | 10/1999 | Ishida et al. |
| 6,202,813 | B1 | 3/2001 | Yahata et al. |
| 6,516,931 | B2 | 2/2003 | Kroger |
| 7,166,054 | B2 | 1/2007 | Urabe |
| 7,475,763 | B2 | 1/2009 | Jegatheeson |
| 7,617,920 | B2 | 11/2009 | Kanehisa |
| 7,621,842 | B2 * | 11/2009 | Kamiya ................. B62M 11/16 192/47 |
| 7,682,283 | B2 | 3/2010 | Okoochi et al. |
| 7,938,242 | B2 * | 5/2011 | Chen ....................... F16D 41/30 192/46 |
| 8,210,331 | B2 | 7/2012 | Keshtkar |
| 8,276,731 | B2 * | 10/2012 | Chen ..................... B60B 27/023 192/46 |
| 8,376,110 | B2 | 2/2013 | Yamamoto |
| 8,414,434 | B2 | 4/2013 | Mercat et al. |
| 8,657,719 | B2 | 2/2014 | Lin |
| 2007/0089958 | A1 | 4/2007 | Kanehisa |
| 2010/0252389 | A1 * | 10/2010 | French .................... F16D 41/30 192/64 |
| 2012/0083383 | A1 | 4/2012 | Steuer et al. |

(Continued)

FOREIGN PATENT DOCUMENTS

EP   1947003 A1   7/2008
EP   1947003 B1   12/2010

(Continued)

*Primary Examiner* — Richard Lorence

(74) *Attorney, Agent, or Firm* — Maxey Law Offices, PLLC; Stephen Lewellyn

(57) ABSTRACT

A releasable freewheel clutch includes a ring gear and a driven member disposed within a bore of the ring gear. A plurality of pawls are each pivotally attached to the driven member and rotatable between a first position where each pawl is engaged with teeth of the ring gear and a second position where each pawl is disengaged with the teeth of the ring gear. The pawls are selective movable between the engaged and disengaged positions by a ring-shaped blocking element that is rotatably supported for rotation about the axis of rotation and relative to the driven member.

17 Claims, 9 Drawing Sheets

(56) References Cited

U.S. PATENT DOCUMENTS

2013/0299295 A1\* 11/2013 Yang ..................... F16D 41/26
                                                                         192/64

FOREIGN PATENT DOCUMENTS

| | | |
|---|---|---|
| GB | 426103 A | 3/1935 |
| GB | 596527 A | 1/1948 |
| WO | 03/092953 A1 | 11/2003 |

\* cited by examiner

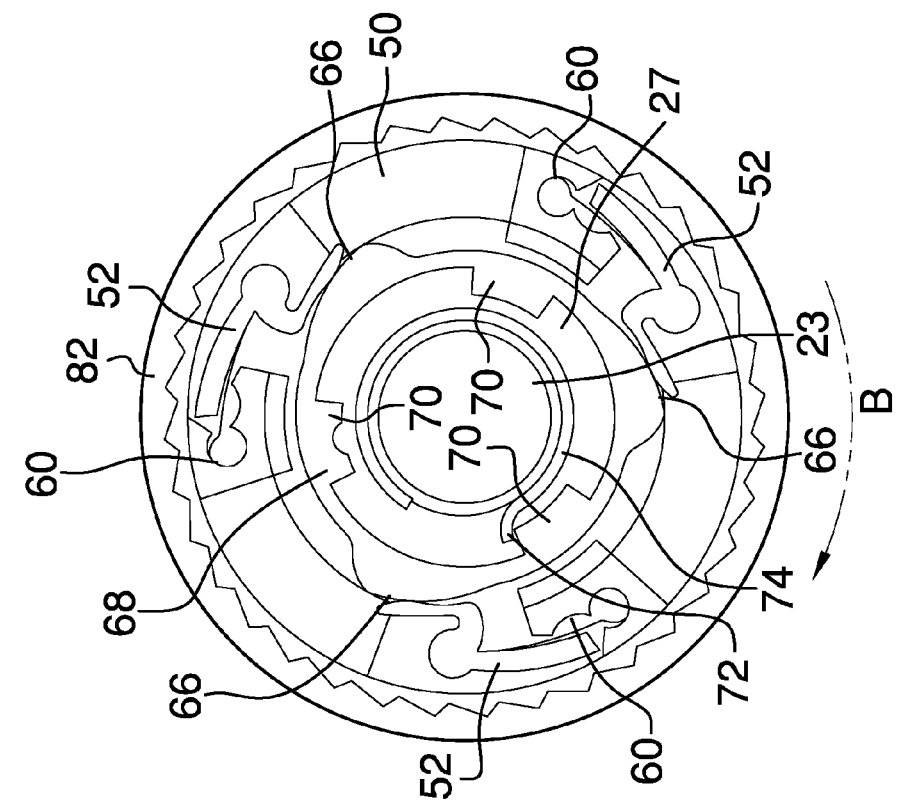
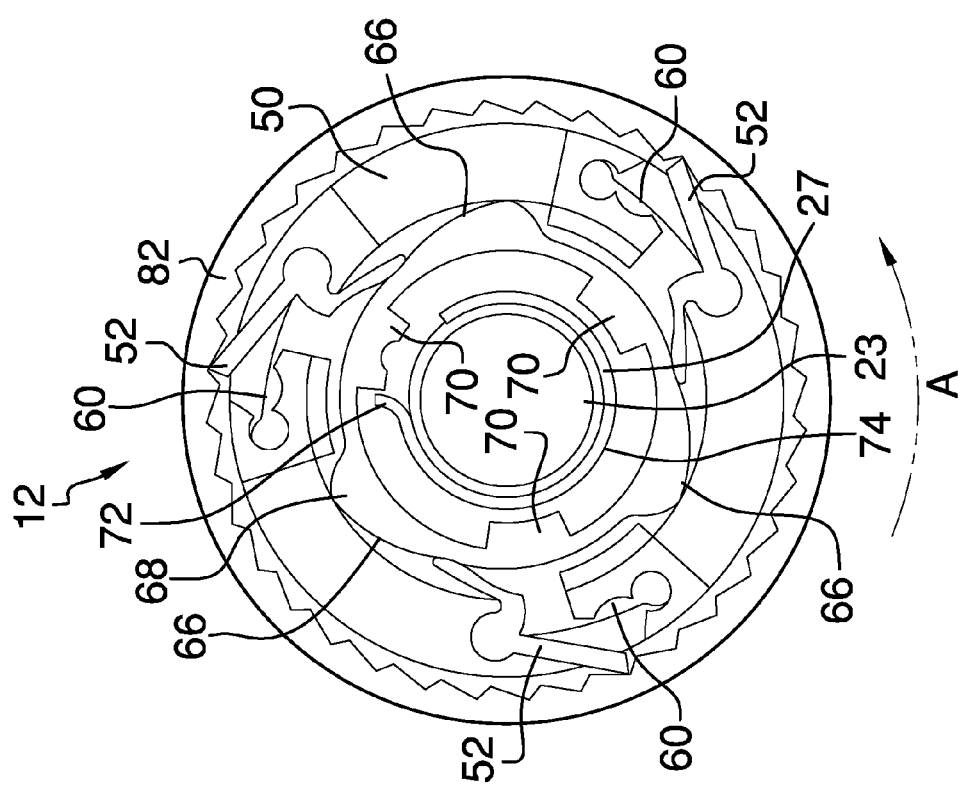

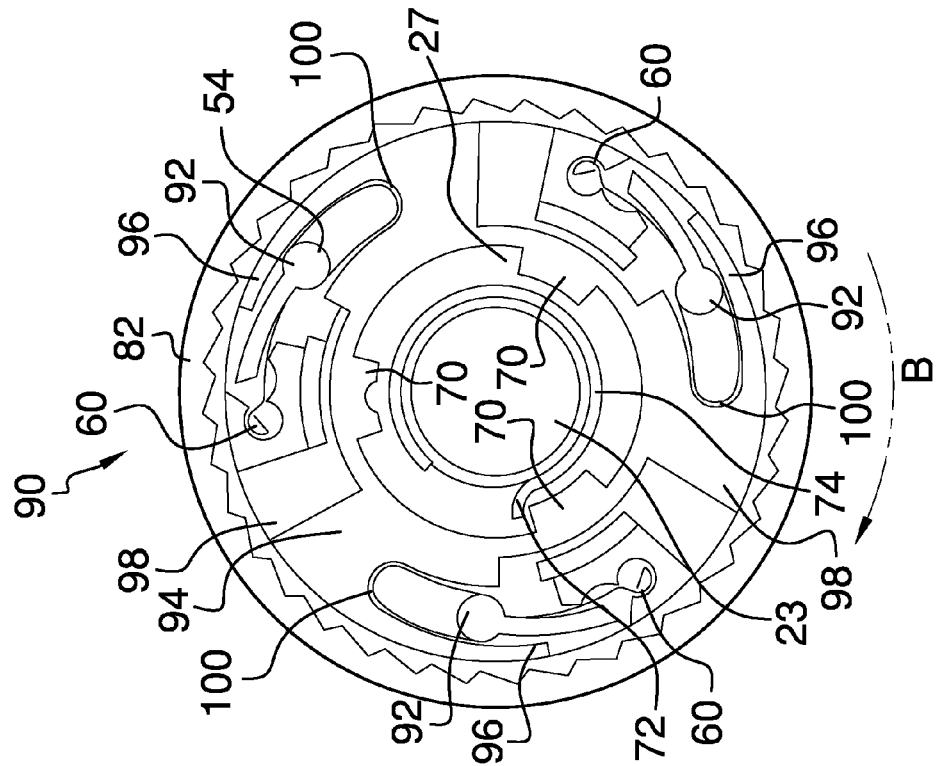
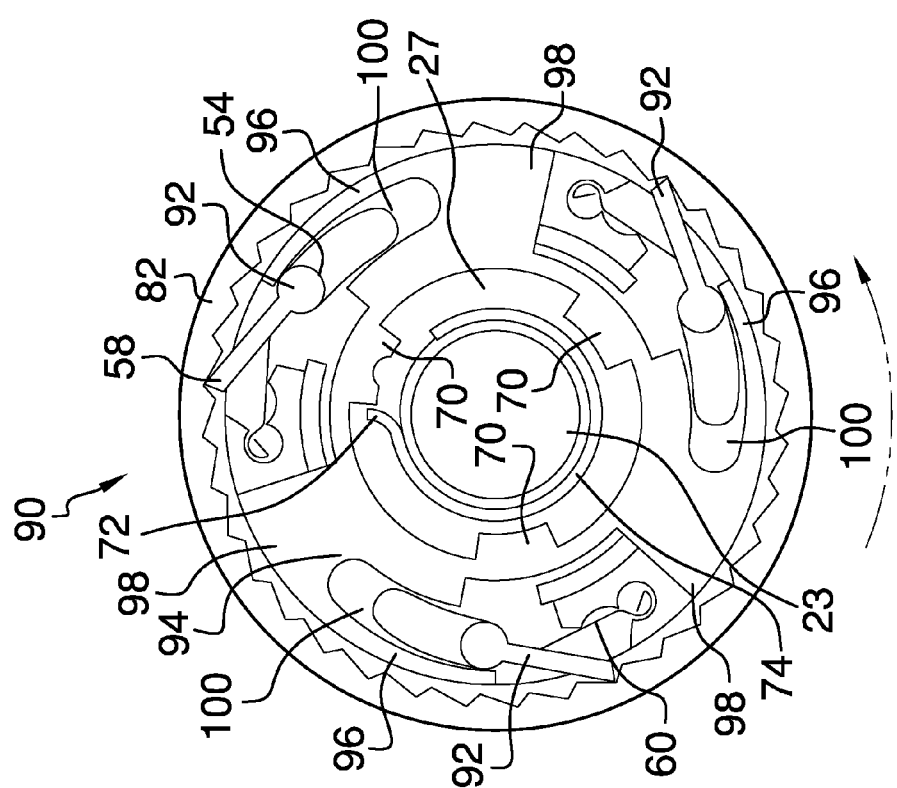
FIG. 12
FIG. 13

RELEASABLE FREEWHEEL CLUTCH

FIELD OF THE INVENTION

The present invention relates generally to freewheel clutches, and more particularly, relating to releasable freewheel clutches for use in a bicycle hub.

BACKGROUND OF THE INVENTION

Releasable freewheel clutches are known. Conventionally, a releasable freewheel clutch includes an outer element that rotates relative to an inner element and has engaged and disengaged operating positions that control the rotation of the elements. When engaged, the clutch allows the outer element, for example, to rotate in one direction (e.g., clockwise). And when disengaged, the outer element is allowed to rotate in both the clockwise and counter-clockwise directions. Friction clutches are typically used as a mechanism that operates to engage or disengage the freewheel clutch. Friction clutches are subject to wear which can affect durability and function of the freewheel clutch.

While the devices heretofore fulfill their respective, particular objectives and requirements, they do not provide a releasable freewheel clutch utilizing a positively engaging gear and pawls as such there exists and need for a releasable freewheel clutch utilizing a positively engaging gear and pawls, which substantially departs from the prior art, and in doing so provides an apparatus primarily developed for the purpose of engaging and disengaging the outer element of the freewheel clutch from the inner element of the freewheel clutch.

SUMMARY OF THE INVENTION

In view of the foregoing disadvantages inherent in the known types of releasable freewheel clutches now present in the prior art, the present invention provides a new releasable freewheel clutch with a positively engaging gear and pawls construction wherein the same can be used for engaging and disengaging the outer element of the freewheel clutch from the inner element of the freewheel clutch.

In accordance with the present invention, an apparatus for engaging and disengaging the outer element of the freewheel clutch from the inner element of the freewheel clutch, utilizing a positively engaging gear and pawls is provided.

In general, in one aspect, a releasable freewheel clutch is provided. The releasable freewheel clutch includes a ring gear having a bore and a plurality of teeth disposed along an interior circumference of the bore. The ring gear is supported for rotation about an axis of rotation. A driven member is disposed within the bore of the ring gear and is rotatably supported for rotation about the axis of rotation. A plurality of pawls are pivotally received by the driven member for rotation in a generally radial direction relative to the axis of rotation. A plurality of biasing elements bias a corresponding pawl along the radial direction in a direction outwardly from the axis of rotation. A ring-shaped blocking element is rotatably supported for rotation about the axis of rotation and relative to the driven member. And, wherein rotating the ring-shaped blocking element in a first direction causes the pawls to rotate along the radial direction in a direction inwardly toward the axis of rotation and disengage from the teeth of the ring gear.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings:

FIG. 4 is a diagrammatic view of a releasable freewheel clutch constructed in accordance with an embodiment of the present invention, showing the releasable freewheel clutch in an engaged position;

FIG. 5 is a diagrammatic view of a releasable freewheel clutch constructed in accordance with an embodiment of the present invention, showing the releasable freewheel clutch in a disengaged position;

FIG. 12 is a diagrammatic view of the releasable freewheel clutch of the embodiment illustrated in FIG. 10, showing the releasable freewheel clutch in an engaged position; and FIG. 13 is a diagrammatic view of the releasable freewheel clutch of the embodiment illustrated in FIG. 10, showing the releasable freewheel clutch in a disengaged position.

DETAILED DESCRIPTION OF THE INVENTION

Figure 1:
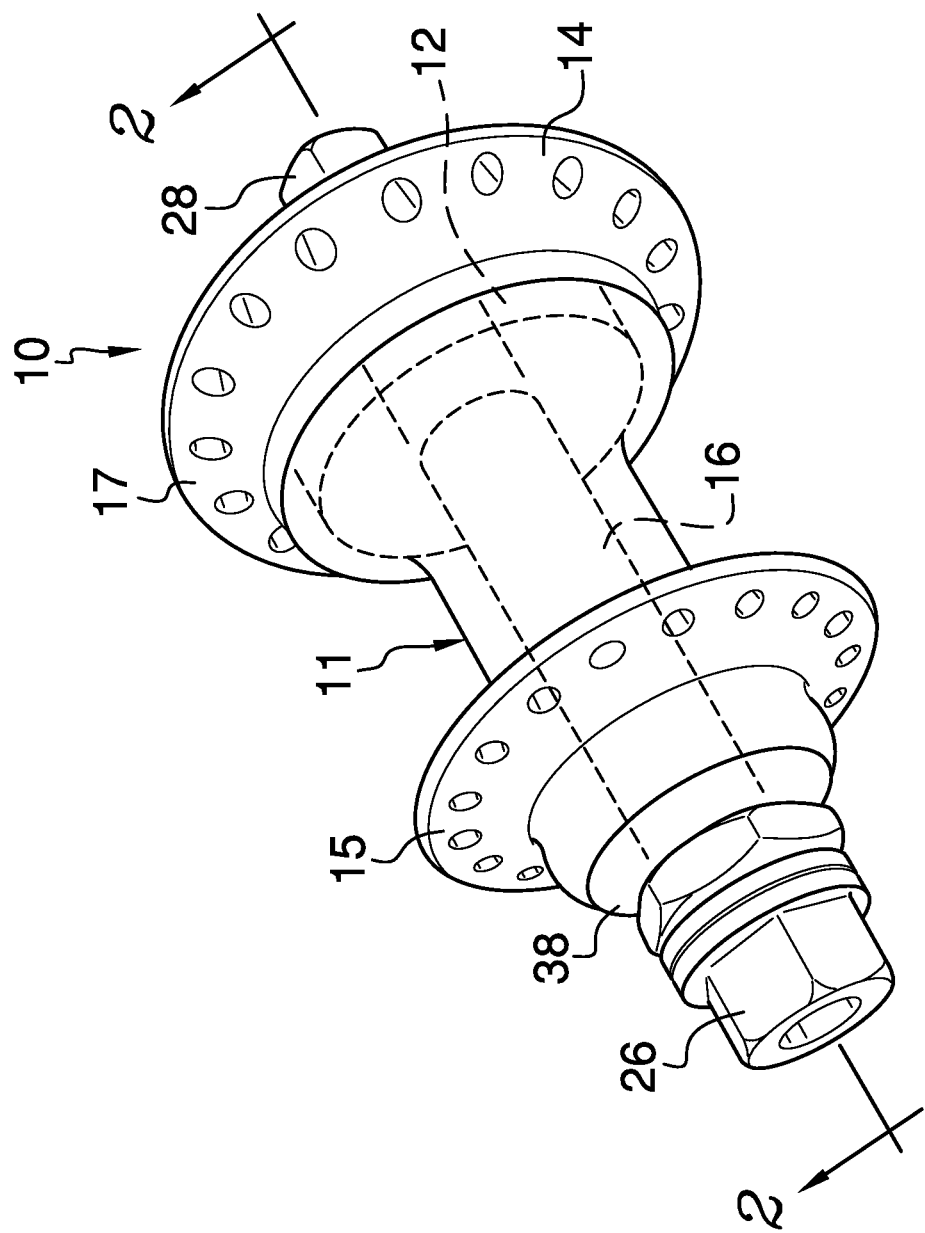
FIG. 1 is a perspective view of a hub used in connection with a releasable freewheel clutch constructed in accordance with an embodiment the present invention.

Initially, with reference to FIG. 1 there is representatively illustrated a bicycle wheel hub and releasable freewheel clutch assembly 10 that is constructed in accordance with an embodiment of the present invention. Assembly 10 broadly includes a hub 11, a freewheel clutch 12, and a spindle 16.

As shown in FIG. 1, the hub 11 includes an elongated hub housing 14 that has opposite ends 15 and 17. Conventionally, ends 15 and 17 include a plurality of circumferentially spaced holes that receive and retain the inside ends of the spokes of a bicycle wheel (not illustrated). Spindle 16 extends through the hub housing 14 and secured at its opposite ends by fasteners 26 and 28. Conventionally, spindle 16 is secured to a bicycle frame (not shown), for example, at the dropouts of the frame by sandwiching the dropouts between the hub 11 and threaded fasteners 26 and 28. To this end, the hub 11 is rotatably supported on spindle 16 for rotation relative to the bicycle frame. As discussed in further detail below, clutch 12 is operable to control the direction that hub 11 is permitted to rotate on spindle 16, and, ultimately, with respect to the bicycle frame.

Figure 2:
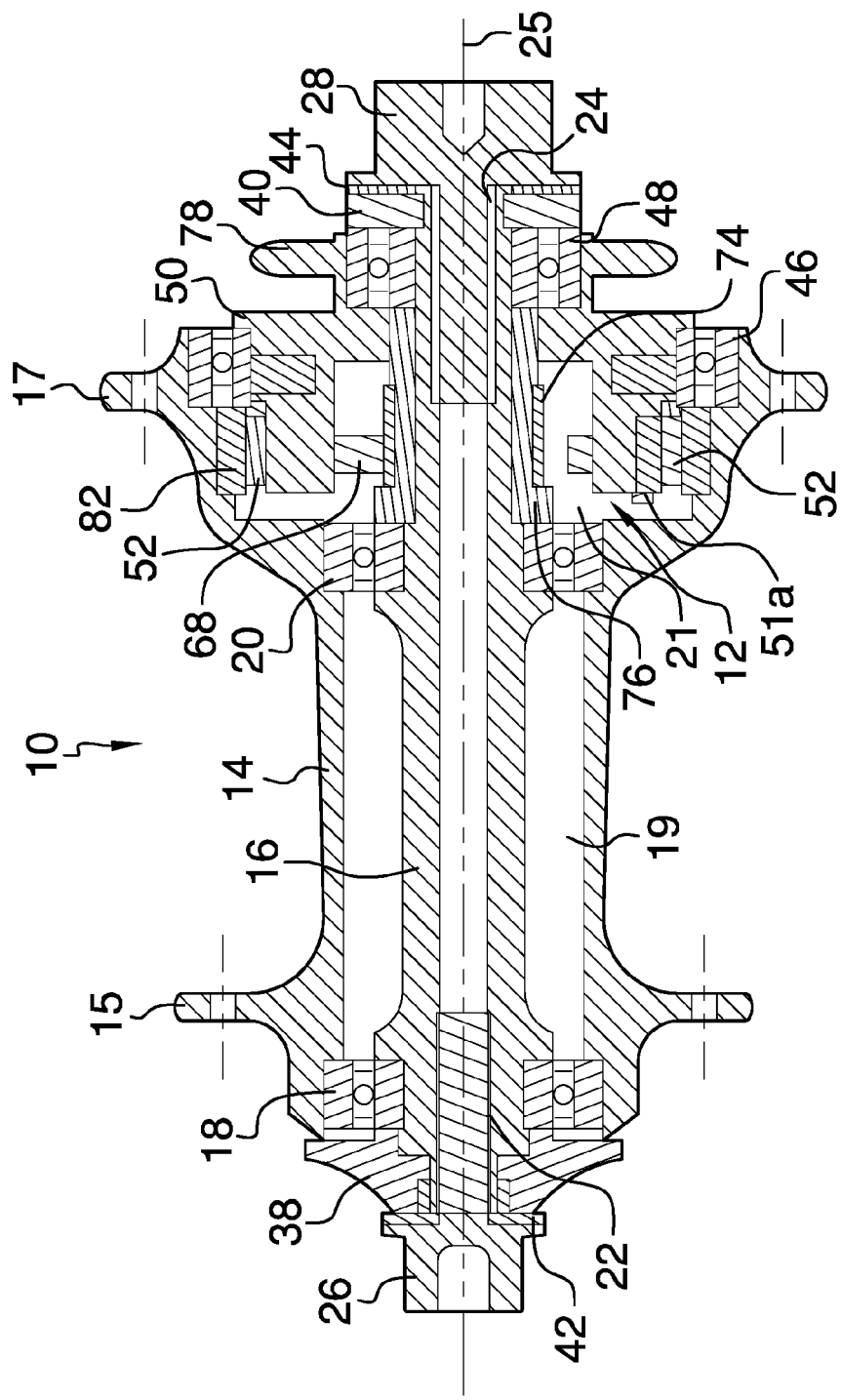
FIG. 2 is a cross-sectional view taken along line 2-2 in FIG. 1, showing the hub and releasable freewheel clutch in accordance with an embodiment of the present invention.

With further reference to FIG. 2 there is illustrated a longitudinal cross-section of assembly 10. As illustrated, hub housing 14 has a longitudinal bore 19 that extends through the hub housing 14 and its ends 15 and 17. A larger diameter bore 21 is formed through end 17 of hub housing 14. The clutch 12, the details of which are discussed below, is disposed in bore 21 and is rotatably supported therein by bearing 46.

The spindle 16 extends through bores 19 and 21 of hub housing and bore 23 of the clutch 12. The hub housing 14 and clutch 12 are rotatably supported on spindle 16 for rotation about axis 25 by bearings 18, 20, and 48. In the illustrated embodiment, opposite ends of the spindle 16 have threaded bores 22 and 24 into which threaded bolts 26 and 28, respectively, are threadably received to retain the assembly 10 together. Alternatively, the opposite ends of the spindle 16 may be externally threaded to threadably receive corresponding threaded nuts to retain the assembly 10 together. Spacers 38 and 40 and washers 42 and 44 may be positioned between said spindle 16 and said bolts 26 and 28.

Figure 3:
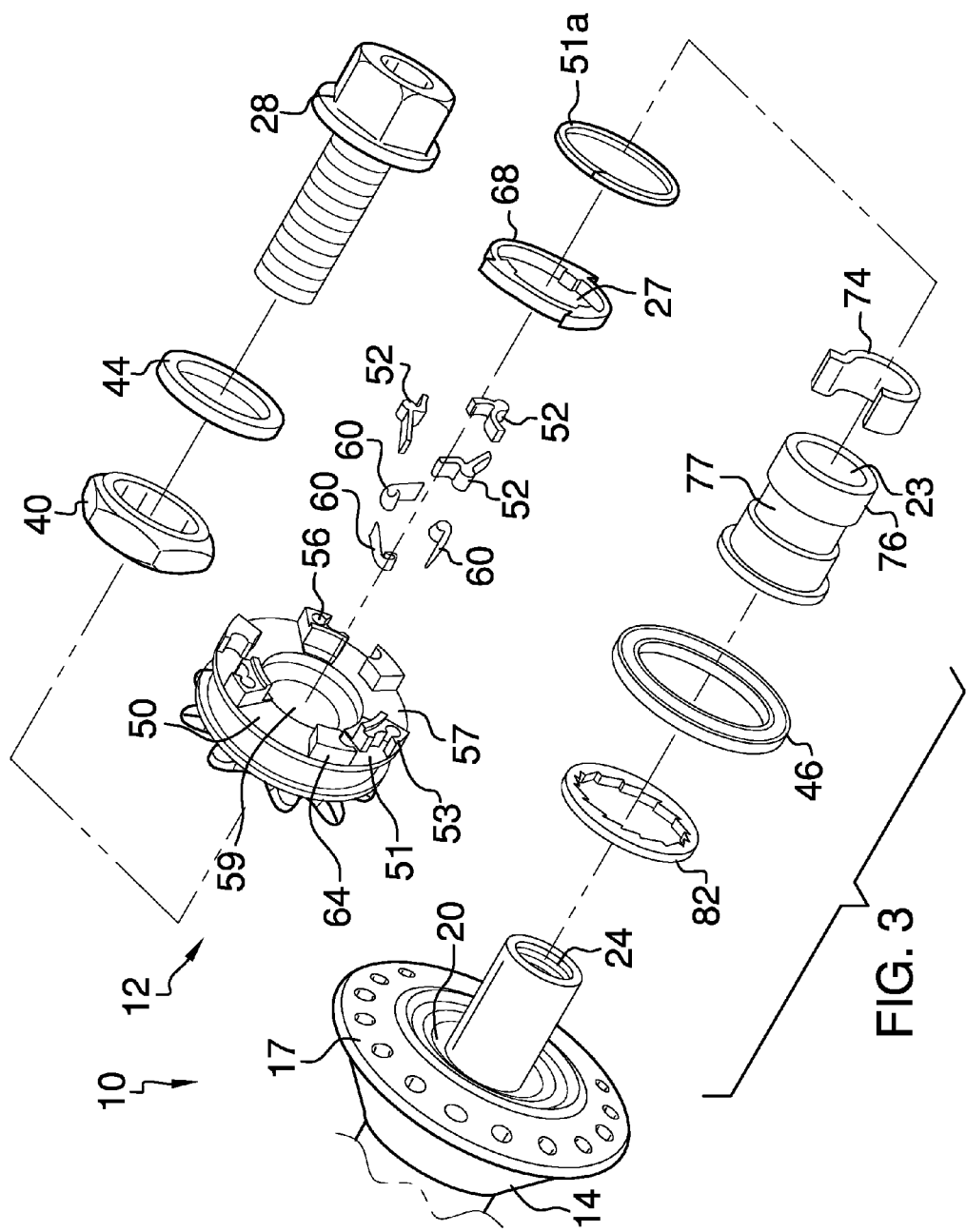
FIG. 3 is an exploded view of the releasable freewheel clutch and a portion of the hub into which the releasable freewheel clutch is disposed.

With continued reference to FIG. 2, and with further reference to FIG. 3, clutch 12 broadly includes an elongated sleeve 76 having bore 23 through which the spindle 16 passes, a driven member 50 supported by bearing 46 to the circumferential sidewall of bore 21, and a ring gear 82 that is non-movably affixed to the circumferential sidewall of bore 21 for conjoint rotation with hub housing 14.

The driven member 50 includes central bore 59 into which the sleeve 76 is disposed. An inward facing surface 51 of driven member 50 has a plurality of circumferentially spaced seats 53 disposed thereon. Each seat 53 includes a pair of confronting semi-circular recesses 56 and 64 formed through confronting sides of a radial notch 57.

Figure 7:
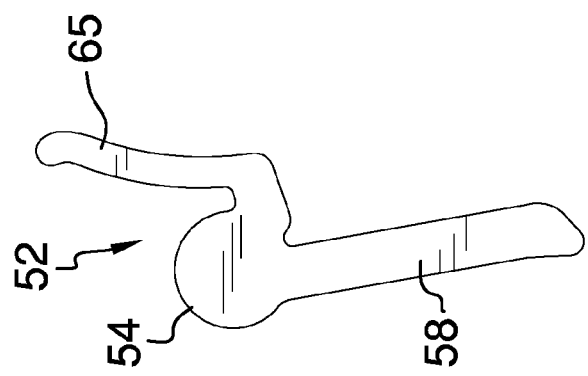
FIG. 7 is a diagrammatic view of a Z-shaped pawl of a releasable freewheel clutch constructed in accordance with an embodiment of the present invention.
Figure 6:
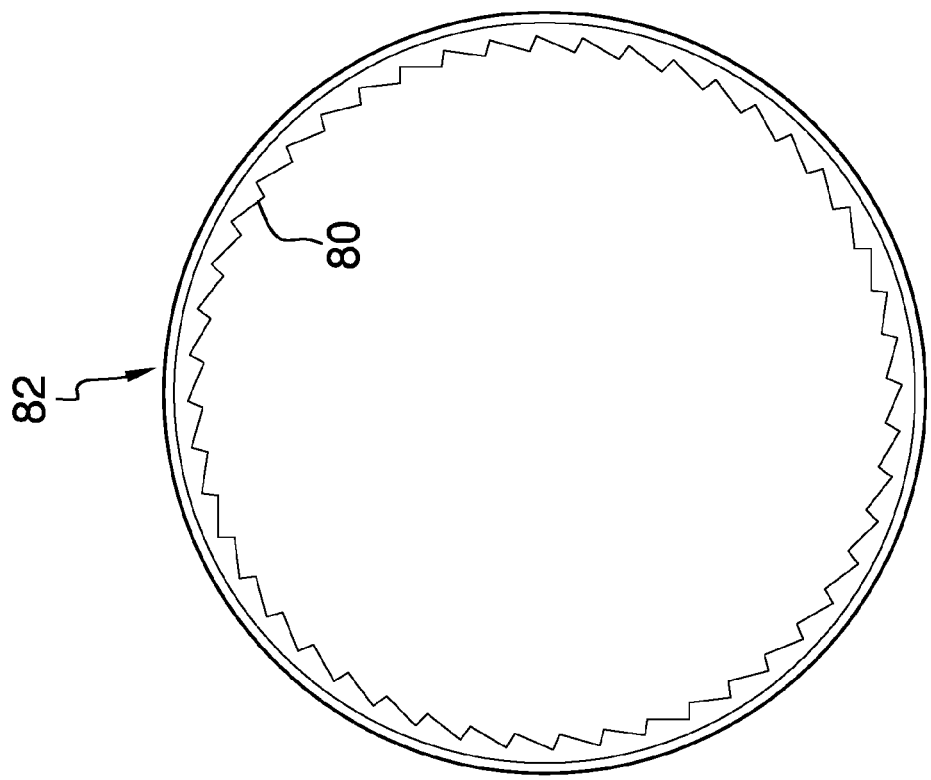
FIG. 6 is a diagrammatic view of a ring gear of a releasable freewheel clutch constructed in accordance with an embodiment of the present invention.
Figure 9:
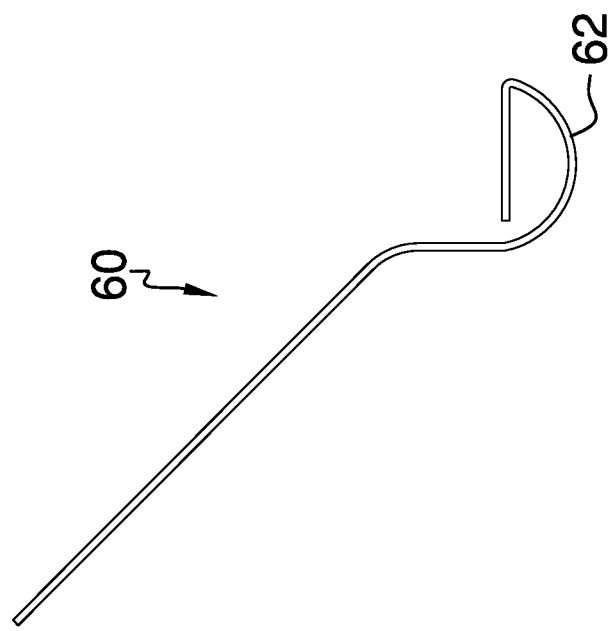
FIG. 9 is a diagrammatic view of a leaf spring of a releasable freewheel clutch constructed in accordance with an embodiment of the present invention.
Figure 8:
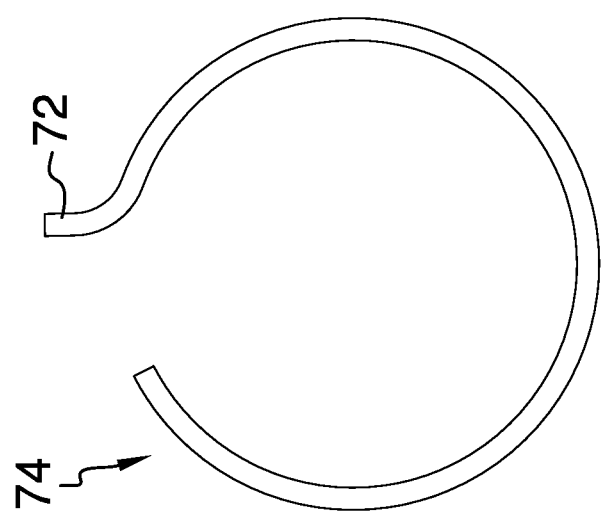
FIG. 8 is a diagrammatic view of a tab ring of a releasable freewheel clutch constructed in accordance with an embodiment of the present invention.
Figure 10:
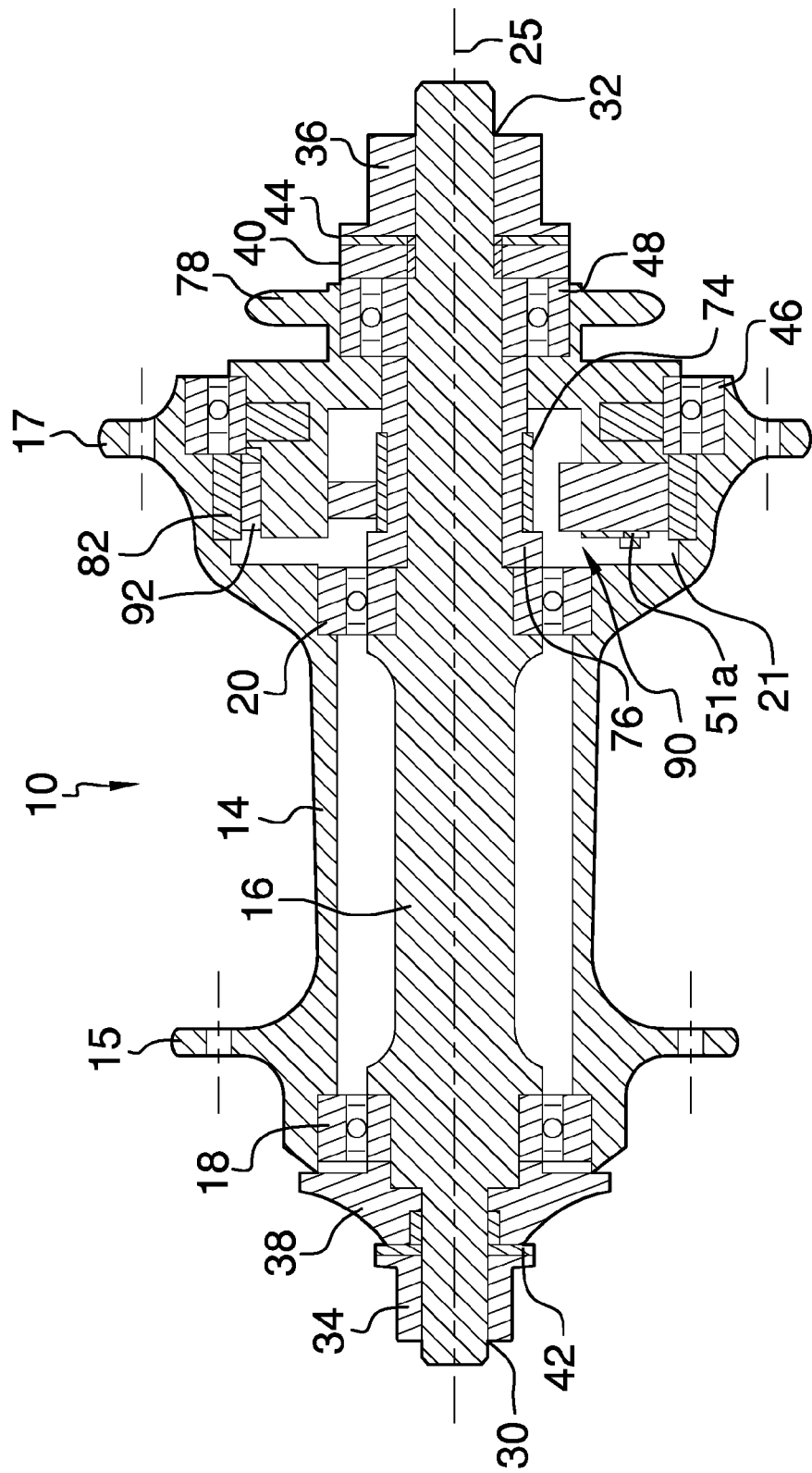
FIG. 10 is a longitudinal cross-sectional view similar to that of FIG. 2, illustrating a releasable freewheel clutch according to another embodiment of the present invention.
Figure 11:
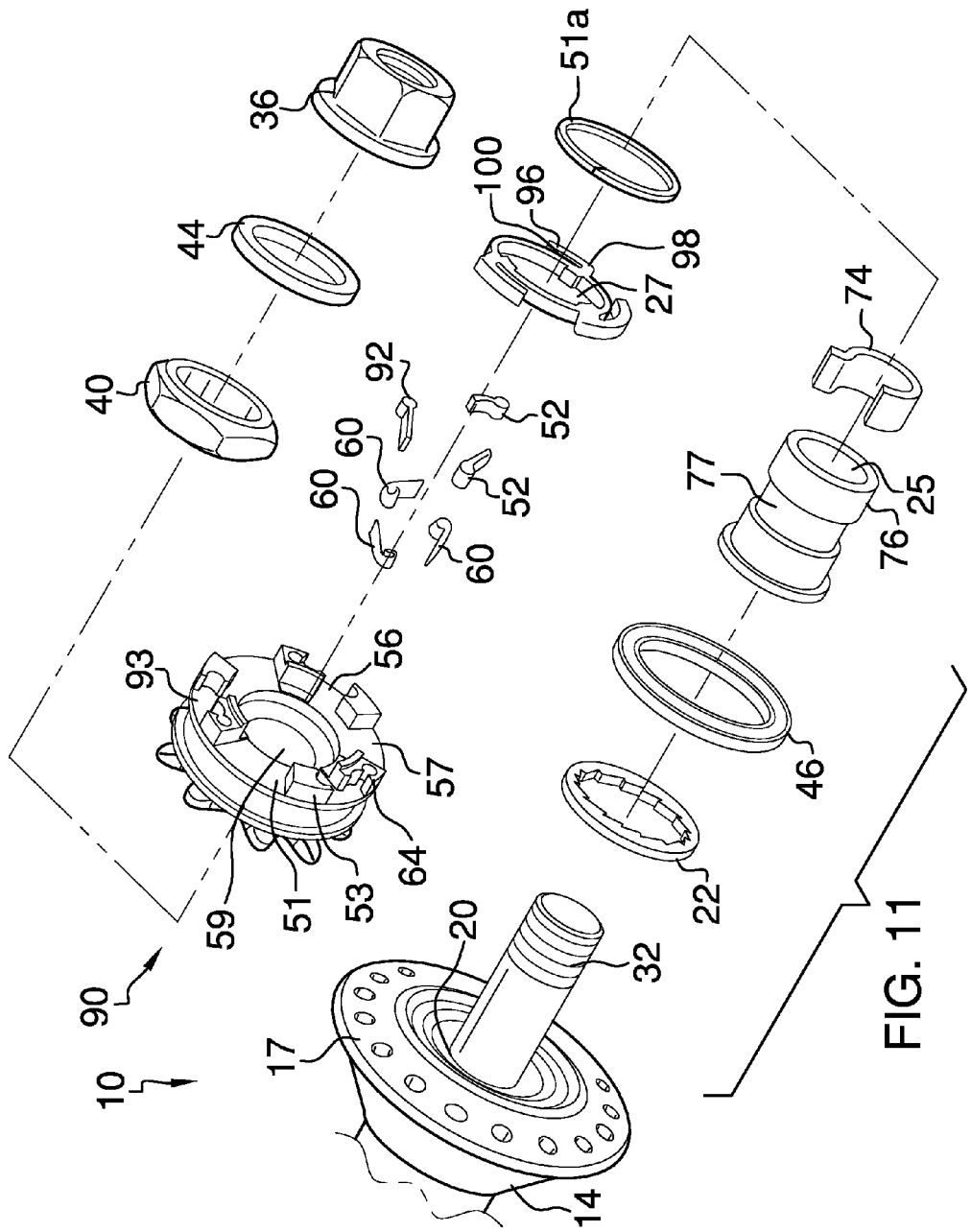
FIG. 11 is an exploded view of the releasable freewheel clutch of the embodiment illustrated in FIG. 10.

Clutch 12 further includes a plurality of generally Z-shaped pawls 52. Each pawl 52 includes a cylindrical pintle 54, a first leg 58 that extends outwardly from the pintle 54, and second leg 65 that extends outwardly from the pintle 54 in a direction opposite of the first leg 58, as best seen in FIG. 7.

Each pawl 52 is pivotally connected to the driven member 50 with pintle 54 being positioned within semi-circular recess 56 and with leg 58 disposed along a radially outward side of driven member 50 and with leg 65 disposed along a radially inward side of driven member 50. A corresponding leaf spring 60 includes a rounded end 62 that is received in the other semi-circular recess 64. The leaf spring 60 biases against leg 58 urging the pawl 52 in a generally radially outward direction. The pawls 52 and leaf springs 60 are axially retained in the driven member 50 by a snap ring 51a.

A generally ring-shaped blocking element 68 is disposed within bore 59 of the driven member 50 and is rotatably supported for rotation within bore 59 relative to the driven member 50 by spacer 76. Particularly, the blocking element 68 is disposed between the driven member 50 and the spacer 76. The blocking element 68 includes a plurality of ramp surfaces 66 that are circumferentially spaced along the outer diameter of the blocking element 68. The blocking element 68 also includes a plurality of circumferentially spaced control tabs 70 that extend radially inward in a direction toward the spindle from the inner diameter of the blocking element 68. The control tabs 70 are unevenly spaced around the inner diameter to adjust slack between engaged and disengaged positions, as discussed further below.

The clutch 12 further includes a selector ring 74 having a selector tab 72 that extends radially outward from the ring. In the illustrated embodiment, the ring 74 is split and clips to the spacer 76 within recess 77, such that selector tab 72 is disposed between a two control tabs 70 of the blocking element. Rotation of the selector ring 74 engages the selector tab 72 with one of the two control tabs 70 of the blocking element 68 depending on its direction of rotation. Further rotation of the selector ring 74 causes rotatably drives the blocking element 68 relative to driven member 50.

The selector ring 74 is attached to spacer 76 by a compression fit that permits the selector ring 74 to rotate with the spacer. Additionally, spacer 76 is compressed between an inner race of bearing 48 and an inner race of bearing 20 so that a drag is created between spacer 76 and spindle 16 to provide a resistance to the rotation of the selection ring 74 relative to the blocking element 68. The drag between spacer 76 and spindle 16 is sufficient to cause the selector ring 74 drive the blocking element 68 relative to driven element 50 between engaged and disengaged positions. However, the drag between spacer 76 and spindle 16 is insufficient to cause rotation of blocking element 68 relative to driven element 50 beyond the engaged and disengaged positions.

The space between control tabs 70 adjusts the amount of rotation of the blocking element 68 relative to the selector tab 72 that is required when transitioning between engaged and disengaged positions before selector tab 72 engages with the respective control tab 70. Preferably, the radian between each of control tabs 72 are different so that a positioning of the selector tab 72 between any pair of control tabs 72 provides a different degree of rotation that is required of the selector ring 74 relative to the blocking element 68 to transition between the engaged and disengaged positions before said selector tab 72 engages with the respective control tab 70.

A sprocket 78 is affixed to an outwardly disposed side of the driven element 50 for conjoint rotation with the drive element 50. Sprocket 78 is drivingly engaged with a chain of a bicycle to which the bicycle hub 11 is mounted.

With further reference to FIGS. 4 and 5, driven element 50 is rotated in direct relation to the chain of the bicycle. When a rider of the bicycle pedals in a forward direction the driven element 50 rotates in a forward direction A. When the rider of the bicycle pedals in a backward direction the driven element 50 rotates in a backward direction B. Changing the position of the selector tab 72 between selected control tabs 74 adjusts the degree of rotation of the pedals required to select the freewheel clutch 12 from an engaged position to a disengaged position.

Rotating the driven element 50 in the forward direction A drives the blocking element in the same direction and causes pawls 52 to rotate in the outward direction and engage teeth 80 of gear 82, thereby positioning the clutch 12 into the engaged position. In the engaged position, driven member 50 is rotationally engaged with hub 11 for rotation in direction A.

Conversely, rotating the driven element 50 in backward direction B drives the blocking element in the same direction and causes pawl 52 rotate in the inward direction backward direction B which disengages pawls 52 with teeth 80 of gear 82, thereby positioning the clutch 12 into the disengaged position. Rotation of driven element 50 in backward direction B beyond the free rotation angle between control tabs 70 results in the transition of freewheel clutch 12 from the engaged position to the disengaged position. In the disengaged position, driven element 50 is permitted to freely rotate in either direction without driving hub 11.

Now with reference to FIGS. 10 through 13, the bicycle wheel hub and releasable freewheel clutch assembly 10 is illustrated with a releasable freewheel clutch 90 that is constructed in accordance with another embodiment of the present invention, and wherein the same reference numbers refer to elements previously discussed. In this embodiment, pawls 50 are replaced by pawls 92 and the ring shaped blocking element 68 is replaced by ring shaped blocking element 94.

Each pawl 92 includes the cylindrical pintle 54 and the first leg 58 that extends outwardly from the pintle 54. Unlike pawls 50, pawls 92 do not include the second leg 65. However, similar to pawls 50, each pawl 92 is pivotally connected to the driven member 50 with pintle 54 being positioned within semi-circular recess 56 and with leg 58 disposed along a radially outward side of driven member 50. A corresponding leaf spring 60 biases against leg 58 urging the pawl 92 in a generally radially outward direction.

The blocking element 94 includes a plurality of tabs 98 that are circumferentially spaced along and extend radially outward from the outer diameter of the blocking element. Each tab 98 includes a circumferential channel 100 formed through a radial side that defines a cover element 96. Additionally, similar to blocking element 65, blocking element 94 also includes the control tabs 70.

Each channel 100 is sized and disposed to receive therein a corresponding pawl 92 therein when the blocking element 94 is rotated in direction A, which causes the pawl to rotate in the inward direction and to be captively received by the channel. With pawls 92 captively retained by channels 100, the clutch 90 is positioned into the disengaged position. Conversely, rotating the blocking element 94 in the opposite, B direction removes the corresponding pawl 92 from the channel and permits the pawl to be biased by the leaf spring 60 and rotate in the outward direction and engage the teeth 80 of the ring gear 82. In this position, the clutch 90 is in the engaged position. Blocking element 94 is operatively driven the same way as blocking element 50 as discussed above.

A number of embodiments of the present invention have been described. Nevertheless, it will be understood that various modifications may be made without departing from the spirit and scope of the invention. Accordingly, other embodiments are within the scope of the following claims.

What is claimed is:

1. A releasable freewheel clutch, comprising:
a ring gear having a bore and a plurality of teeth disposed along an interior circumference of said bore, said ring gear supported for rotation about an axis of rotation;
a driven member disposed within said bore of said ring gear and rotatably supported for rotation about said axis of rotation;
a plurality of pawls, each being received by said driven member for rotation in a generally radial direction relative to said axis of rotation;
a plurality of biasing elements, each biasing a corresponding pawl along said radial direction in a direction outwardly from said axis of rotation;
a ring-shaped blocking element rotatably supported for rotation about said axis of rotation and relative to said driven member;
wherein rotating said ring-shaped blocking element in a first direction causes said pawls to rotate along said radial direction in a direction inwardly toward said axis of rotation and disengage from said teeth of said ring gear; and
wherein said ring-shaped blocking element includes at least two circumferentially spaced control tabs extending inwardly from an inner diameter of said ring-shaped blocking element.

2. The releasable freewheel clutch of claim 1, wherein rotating said ring-shaped blocking element in an opposite, second direction permits each pawl to be biased along said radial direction in a direction outwardly from said axis of rotation and engage said teeth of said ring gear.

3. The releasable freewheel clutch of claim 1, wherein said driven member has a plurality of circumferentially spaced seats; and each of said pawls is pivotally received by a corresponding one of said seats.

4. The releasable freewheel clutch of claim 3, wherein each of said plurality of biasing elements is received by a corresponding one of said seats.

5. The releasable freewheel clutch of claim 1, wherein the spaces between each of said control tabs is different.

6. The releasable freewheel clutch of claim 1, wherein said ring-shaped blocking element comprises a plurality of ramp surfaces circumferentially spaced along an outer diameter of said ring-shaped blocking element.

7. The releasable freewheel clutch of claim 6, wherein each of said plurality of pawls comprises a leg disposed along a radially inward side of driven member.

8. The releasable freewheel clutch of claim 7, wherein each leg of said plurality of pawls operatively engages one of said ramp surfaces when disposed in an engagement position.

9. The releasable freewheel clutch of claim 1, wherein said ring-shaped blocking element comprises a plurality of circumferential channels.

10. The releasable freewheel clutch of claim 9, wherein each of said plurality of circumferential channel operatively engages one of said plurality of pawls when disposed in a disengagement position.

11. A bicycle hub and releasable freewheel clutch, comprising:
- a hub having a hub housing;
- a spindle extending through said hub housing, and said hub housing rotatably supported on said spindle for rotation about an axis of rotation;
- a ring gear having a bore and a plurality of teeth disposed along an interior circumference of said bore, said ring gear affixed to said hub housing for conjoint rotation about said axis of rotation;
- a driven member disposed within said bore of said ring gear and rotatably supported for rotation about said axis of rotation;
- a plurality of pawls, each being received by said driven member for rotation in a generally radial direction relative to said axis of rotation;
- a plurality of biasing elements, each biasing a corresponding pawl along said radial direction in a direction outwardly from said axis of rotation;
- a ring-shaped blocking element rotatably supported for rotation about said axis of rotation and relative to said driven member;
- wherein rotating said ring-shaped blocking element in a first direction causes said pawls to rotate along said radial direction in a direction inwardly toward said axis of rotation and disengage from said teeth of said ring gear; and
- wherein said ring-shaped blocking element includes at least two circumferentially spaced control tabs extending inwardly from an inner diameter of said ring-shaped blocking element.

12. The bicycle hub of claim 11, wherein rotating said ring-shaped blocking element in an opposite, second direction permits each pawl to be biased along said radial direction in a direction outwardly from said axis of rotation and engage said teeth of said ring gear.

13. The bicycle hub of claim 11, wherein said driven member has a plurality of circumferentially spaced seats; and each of said pawls is pivotally received by a corresponding one of said seats.

14. The bicycle hub of claim 13, wherein each of said plurality of biasing elements is received by a corresponding one of said seats.

15. The bicycle hub of claim 11, wherein the spaces between each of said control tabs is different.

16. The bicycle hub of claim 15, wherein said ring-shaped blocking element comprises a plurality of ramp surfaces circumferentially spaced along an outer diameter of said ring-shaped blocking element.

17. The bicycle hub of claim 11, wherein said ring-shaped blocking element comprises a plurality of circumferential channels.

\* \* \* \* \*